United States Patent [19]

Fukami et al.

[11] Patent Number: 5,071,613

[45] Date of Patent: Dec. 10, 1991

[54] METHOD FOR PRODUCING POLYURETHANE TYPE COMPOSITE

[75] Inventors: Takao Fukami, Fujisawa; Hirokazu Oka; Koji Kanaya, both of Yokohama, all of Japan

[73] Assignee: Nippon Polyurethane Industry Co., Ltd., Tokyo, Japan

[21] Appl. No.: 484,437

[22] Filed: Feb. 16, 1990

Related U.S. Application Data

[63] Continuation of Ser. No. 217,379, Jul. 11, 1988, abandoned.

[30] Foreign Application Priority Data

Jul. 11, 1987 [JP] Japan ................................ 62-172076

[51] Int. Cl.$^5$ .............................................. B29C 45/14
[52] U.S. Cl. ................................. 264/257; 264/46.4; 264/328.6; 264/331.19
[58] Field of Search .................... 264/257, 328.6, 46.4, 264/331.19

[56] References Cited

U.S. PATENT DOCUMENTS

| 4,150,206 | 4/1979 | Jourquin et al. ................ 521/51 |
| 4,435,349 | 3/1984 | Dominquez et al. ............. 264/257 |
| 4,469,653 | 9/1984 | Nissen et al. ..................... 264/51 |
| 4,598,103 | 7/1986 | Chang .............................. 521/126 |
| 4,658,008 | 4/1987 | Tufts . | |
| 4,664,862 | 5/1987 | Ghavamikia ................... 264/257 |
| 4,692,479 | 9/1987 | Schneider et al. ............... 523/209 |
| 4,709,002 | 11/1987 | Younes . | |
| 4,714,575 | 12/1987 | Preston .............................. 264/257 |
| 4,717,738 | 1/1988 | Fukuda et al. ................. 525/327.2 |
| 4,731,427 | 3/1988 | Younes . | |
| 4,732,725 | 3/1988 | Moncheaux et al. ............ 264/328.6 |

FOREIGN PATENT DOCUMENTS 55-133938 10/1980 Japan ................................ 264/328.6

OTHER PUBLICATIONS

Japanese Industrial Standard—Testing Method for Tensile Properties of Plastics; JIS K 7113-1982.
Japanese Industrial Standard—Physical Testing Methods for Vulcanized Rubber; JIS K 6301-1977

Primary Examiner—Robert A. Dawson
Assistant Examiner—Allan Kuhns
Attorney, Agent, or Firm—Davis Hoxie Faithfull & Hapgood

[57] ABSTRACT

A method for producing a polyurethane type composite obtained by injecting a formulated liquid comprises an organic polyisocyanate, a polyol and a curing catalyst into a mold in which a fibrous reinforcing material is previously set, followed by curing, by means of a reaction injection molding machine, characterized in that:
(1) a polyol component having a hydroxyl value of 300 to 800 is used as the polyol, and
(2) an organic acid salt of a tertiary amine is used as the curing catalyst.

5 Claims, No Drawings

METHOD FOR PRODUCING POLYURETHANE TYPE COMPOSITE

This is a continuation of copending application Ser. No. 07/217,379 filed on July 11, 1988, now abandoned.

BACKGROUND OF THE INVENTION

1. Field of the Invention

This invention relates to a rapidly curable method suitable for reaction injection molding for producing a polyurethane type composite which is excellent in high rigidity impact resistance and heat resistance.

2. Related Background Art

In the fiber reinforced plastics (FRP) molding technique of the prior art, the method of obtaining FRP by injecting a thermosetting resin such as unsaturated polyester resin, vinyl ester resin, epoxy resin, etc. into a mold in which a fibrous reinforcing material is previously set is generally called resin injection method or resin transfer molding method, and is known as the method with good economical efficiency utilizing in-mold polymerization.

In the field of industry, particularly the field of automotive industry, it has been demanded to manufacture construction materials having heat resistance in short molding cycle time. However, in the above methods, no satisfaction in both aspects of rapid curability and heat resistance has been obtained.

On the other hand, in the field of polyurethane elastomer, the reaction injection molding (hereinafter called RIM) technique has been developed and applied particularly to molding of bumper, facia etc. of automobile. Since this technique is suitable for manufacturing large size molding, specific features reside in that integration of a large number of parts is possible, and also that the molding cycle time is by far shorter as compared with the above resin injection method.

In recent years, it has been attempted to obtain a composite of thermosetting resin by means of rapid curing by combining the RIM technique with the resin injection method.

More specifically, it is a method in which a fibrous reinforcing material is previously set in a mold, and a thermosetting resin reaction liquid is injected by a RIM machine into the mold.

However, in the case of polyurethane type components used for RIM in the prior art, excessive increasing in viscosity occurs simultaneously with mixing, whereby penetrability into the fibrous reinforcing material is inferior, or even injection may be sometimes difficult. Also, there has been the drawback that no sufficient rigidity as the construction material can be obtained in the polyurethane of the prior art.

The polyurethane type components to be used for RIM molding of the prior art are susceptible to excessive increasing in viscosity simultaneously with mixing during preparation, and therefore it is inferior in penetrability into fibrous reinforcing material, even with injection being sometimes difficult, and its cured product has not attained sufficient rigidity as the construction material.

SUMMARY OF THE INVENTION

The present inventors have studied intensively in order to obtain a composite having high rigidity, impact resistance and heat resistance by rapidly curable method in short molding cycle time, and consequently found that the drawbacks of the prior art can be improved by injecting a specific polyurethane type formulation and curing catalyst into a fibrous reinforcing material, to accomplish the present invention.

According to the present invention, there is provided a method for producing a polyurethane type composite obtained by injecting a formulated liquid comprising an orgaic polyisocyanate, a polyol and a curing catalyst into a mold in which a fibrous reinforcing material is previously set, followed by curing, by means of a reaction injection molding machine, characterized in that:

(1) a polyol component having a hydroxyl value of 300 to 800 is used as the polyol, and (2) an organic acid salt of a tertiary amine is used as the curing catalyst.

DETAILED DESCRIPTION OF THE PREFERRED EMBODIMENTS

Examples of organic polyisocyanates available in the present invention may include aliphatic polyisocyanates such as hexamethylene-1, 6-diisocyanate, 2,2,4- or 2,4,4-trimethylhexamethylene-1,6-diisocyanate, etc.; alicyclic polyisocyanates such as cyclohexane-1,4-diisocyanate, dicyclohexylmethane-4,4'-diisocyanate, etc.; aromatic polyisocyanates such as p-phenylene diisocyanate, tolylene-2,4- and/or -2,6-diisocyanate, diphenylmethane-2,4'- and/or -4,4'-diisocyanate, naphthylene-1,5-diisocyanate, xylylene-1,3- and/or -1,4-diisocyanate, diphenyl ether-4,4'-diisocyanate, etc.

It is also possible to use a polyphenylene polymethylene polyisocyanate of the type obtained by condensation of aniline and formalin before phosgenation, or liquified diphenylmethane diisocyanates having carbodiimide group and/or uretonimine group, or modified polyisocyanates containing urethane group, allophanate group, biuret group and uretodione group, etc.

Isocyanate based prepolymers obtained by the reaction by use of an excess of the above polyisocyanate and polyols can be also employed.

Particularly preferable organic polyisocyanates are diphenylmethane diisocyanate type polyisocyanates such as polyphenylene polymethylene polyisocyanates and diphenylmethane diisocyanates having carbodiimide group or ureton-imine group which are liquid and low viscosity at normal temperature and can give molded product having high rigidity.

The polyol which can be used in the present invention may include various low molecular weight polyols, polyether polyols, polyester polyols.

Representative low molecular weight polyols may include ethylene glycol, propylene glycol, dipropylene glycol, 1,4-butane diol, glycerine, trimethylolpropane and the like.

Representative examples of polyether polyol may include polyether polyols obtained by addition of ethylene oxide, propylene oxide, etc. to polyols such as propylene glycol, glycerine, trimethylolpropane, pentaerythritol, α-methylglycoside, cane sugar, etc.; aminoalcohols such as diethanolamine, triethanolamine, tripropanolamine, etc.; amines such as ethylene diamine, 1,6-hexanediamine, diethylenetriamine, triethylenetetramine, toluylenediamine, methylenebisaniline and the like; phosphorus compounds such as phosphoric acid, pyrophosphoric acid or partial esters of these; and mixtures of these.

Also, there may be included halo-containing polyether polyols obtained by addition of epihalohydrins to polyols such as glycerine, trimethylolpropane, pentaerythritol, sorbitol, etc. in the presence of a cationic catalyst such as $BF_3$, etc.

Representative examples of polyester polyols may include polyester polyols having terminal hydroxyl groups obtained by condensation of diols such as ethylene glycol, propylene glycol, diethylene glycol, 1,4-butane diol, etc., triols such as trimethylolpropane, hexanetriol, glycerine, etc. and further pentaerythritol, sorbitol, etc. with succinic acid, adipic acid, maleic acid, fumaric acid, phthalic acid, isophthalic acid, succinic anhydride, maleic anhydride, phthalic anhydride, etc., and polyesters obtained by ring-opening polymerization of cyclic lactones with the use of glycerine, pentaerythritol, sorbitol, etc. as the initiator.

It is also possible in the present invention to use the so-called "polymer polyol" which is prepared from a macro-polyol and an ethylenically unsaturated monomer (vinyl monomer). These polyols can be used either alone or as a mixture of two or more kinds. The polyol can be used with a hydroxyl value within the range of 300 to 800, and in this case if the hydroxyl value is smaller than 300, the necessary rigidity for construction material can not be obtained, while if it is larger than 800, impact resistance tends to be inferior, and also the reaction is too fast even without use of a catalyst, whereby penetration into fibrous reinforcing material tends to become undesirably difficult.

For the curing catalyst which can be used in the present invention, there are organic acid salts having retarding effect, derived from highly active tertiary amines. Representative examples of tertiary amines may include triethylenediamine, N,N,N'N'-tetramethylpropylenediamine, N,N,N'N'-tetramethylhexamethylenediamine, N,N,N'N'-pentamethyldiethylenetriamine, bis(2-dimethylaminoethyl)ether, 1,8-diazabicyclo(5,4,0)undecene-7, etc. and representative examples of organic acids blocking these compounds may include phenol, formic acid, acetic acid, propionic acid, caproic acid, octylic acid, caprylic acid, adipic acid, etc.

Among them, particularly preferable catalyst is octylate of 1,8-diaza-bicyclo(5,4,0)undecene-7. These can be used either alone or as a mixture of two or more kinds.

In the present invention, a trimerization catalyst known in this field of art can be used in combination. For example, there may be employed tertiary amines such as 2,4,6-tris(dimethylaminomethyl)phenol, 2,4,6-tris(dialkylaminoalkyl)hexahydro-S-triazine, aziridine compounds, etc., phosphines as represented by triethylphosphine, alkali metal salts such as potassium acetate, potassium 2-ethylhexanoate, etc.

Also, in the present invention, catalysts for urethane formation such as tertiary amines or organo-metallic compounds conventionally used for production of polyurethane can be used in combination for the purpose of controlling the reaction. Representative examples may include tertiary amines such as triethylamine, tripropylamine, tributylamine, N-methylmorpholine, dimethylbenzylamine, triethylenediamine, etc., organometallic compounds such as stannous octoate, dibutyltin dilaurate, zinc naphthenate, etc.

In the present invention, selection of the curing catalyst is very critical. Short time molding becomes possible for the first time when the formulated liquid is uniformly impregnated into the fibrous reinforcing material and cured immediately after impregnation. For that purpose, the increasing of viscosity of the injected liquid should be suppressed during the intervals from mixing to completion of impregnation, but when rapid curing is intended to be effected by use of a conventional catalyst for urethane formation, thickening reaction occurs immediately after mixing, whereby impregnatability into the fibrous substrate is remarkably inferior.

Accordingly, investigations were made and consequently it has been found that both of impregnation and curability can be solved by use of delayed action catalysts, particularly a carboxylic acid salt of a tertiary amine. Tertiary amine containing piperazine ring, cyclohexyl ring, etc. has itself delaying effect, but its effect is poor at conventional mold temperature in RIM molding, for example, 50° to 80° C.

The equivalent ratio of isocyanate groups (NCO)/hydroxyl groups (OH) in the present invention may be preferably 0.9 to 2.0, particularly preferably 1.0 to 1.5. In the case of conventional urethane formation, the equivalent ratio NCO/OH is ordinarily set at around 1.0, but in the case of the present invention, curing proceeds sufficiently even at 1.0 or higher to give a product having good physical properties. The reasons may be estimated to be that due to use of an organic acid salt of a highly active tertiary amine, the tertiary amine dissociated during the reaction will catalyze not only for the urethane formation, but also for allophanation, and further trimerization to excessive isocyanate. If the equivalent ratio is less than 0.9, the curability is poor and the molded product obtained is poor in heat resistance, while if the equivalent ratio exceeds 2.0, impact resistance will be undesirably lowered.

The present invention can additively use flame retardants, plasticizers, colorants, various fillers, internal mold release agents, and other processing additives, if desired.

Also in the present invention, for the purpose of making the molded product light weight or improving flow properties by lowering the viscosity of the stock liquid, water (which reacts with isocyanate to generate carbon dioxide gas) and organic blowing agents can be added in the stock liquid or alternatively a gas can be mixed and dissolved into the stock liquid by means of an air loading equipment in carrying out molding, thereby mixing intentionally gas bubbles into the molded product.

For the fibrous glass reinforcing material which can be used in the present invention, there can be included chopped strand mat, continuous strand mat, surfacing mat, glass cloth, roving cloth, etc. Also, carbon fibers, aramide fibers can be similarly used. The above fibrous reinforcing materials can be also used in combination of two or more kinds.

For these fibrous reinforcing materials, it is particularly preferable to use a glass continuous strand mat partially or singly.

By use of a continuous strand mat singly or in combination with another fibrous reinforcing material, penetrability of the formulating liquid can be improved to enhance filling characteristic, and therefore uniform molded product can be obtained.

In the present invention, if necessary, various metal meshes, network moldings of synthetic resins can be also used in combination with the fibrous reinforcing material.

The polyurethane type composite which is obtained short in molding cycle time by the present invention is excellent in moldability, as well as excellent impact resistance, heat resistance and rigidity, and therefore is extremely useful for, for example, bumper beam, floor panel, door inner panel, various trays in the field of automobiles, housing cases in the field of electricity, and other construction materials for general industrial members.

EXAMPLES

The present invention is described in more detail by referring to Examples, but the present invention is not limited thereto.

The physical properties of polymer products were measured according to the following methods.

Specific gravity: according to JIS K-7112.
Flexural modulus, flexural strength: according to JIS K-7203.
Tensile strength, elongation: according to JIS K-7113.
Izod impact, notched: according to JIS K-7110.

EXAMPLES 1-4

In a mold cavity of 300×250×3 mm, a glass continuous strand mat of the same size (produced by Asahi Fiber Glass, trade name: Glasron M8609) was previously set, and the two components of A component (organic isocyanate) and B component (polyol and curing catalyst) were injected thereinto by means of a high pressure reaction injection molding machine (Model MC 102, produced by Polyurethane Engineering), followed by curing, to obtain a test plate.

The molding conditions are shown in Table 1, the recipes and the results are shown in Table 2.

TABLE 1

| | |
|---|---|
| Component temperature | 40° C. |
| Mold temperature | 50-60° C. |
| Injection time | 2.5-3.5 sec. |
| Demold time | 1-2 min. |

TABLE 2

| | | | Example 1 | Example 2 | Example 3 | Example 4 |
|---|---|---|---|---|---|---|
| Formulation (wt-parts) | A Component | Millionate[1] MR200 | 53.9 | — | 70.0 | 31.8 |
| | | Millionate[2] MTL | — | 65.3 | — | 31.8 |
| | B Component | SANNIX[3] GP400 | 46.1 | 27.8 | 24.0 | 23.6 |
| | | Adeca Polyether[4] CM211 | — | — | — | 5.5 |
| | | Glycerine | — | 6.9 | 6.0 | 7.3 |
| | | U-CAT SA102[5] | 1.0 | 0.5 | 0.5 | 0.5 |
| | | DABCO[6] T-45 | — | — | 0.1 | — |
| | | Methyl[7] DABCO | 0.2 | 0.1 | — | 0.1 |
| Polyol hydroxyl value | | | 402 | 688 | 688 | 635 |
| NCO/OH equivalent ratio | | | 1.20 | 1.05 | 1.40 | 1.10 |
| M8609 Wt % | | | 26 | 26 | 26 | 26 |
| Physical properties | Specific gravity | | 1.31 | 1.31 | 1.35 | 1.33 |
| | Flexural modulus Kfg/cm² | | 57,000 | 58,000 | 61,000 | 56,000 |
| | Flexural strength Kgf/cm² | | 1,570 | 1,590 | 1,650 | 1,630 |
| | Tensile strength Kgf/cm² | | 1,160 | 1,100 | 990 | 1,000 |
| | Elongation, % | | 3 | 3 | 3 | 3 |
| | Izod impact Kgf-cm/cm | | 36 | 38 | 34 | 40 |

Note to Table 2:
[1] trade name of organic polyisocyanate (polyphenylene polymethylene polyisocyanate, NCO content of 30.9%) produced by Nippon Polyurethane Industry Co., Ltd.;
[2] trade name of organic polyisocyanate (carbodiimide group containing liquid diphenylmethane diisocyanate, NCO content of 28.8%) produced by Nippon Polyurethane Industry Co., Ltd.;
[3] trade name of polyether polyol, having a hydroxyl value of 402, produced by Sanyo Kasei Kogyo;
[4] trade name of polyether polyol, having a hydroxyl value of 53, produced by Asahi Denka Kogyo;
[5] trade name of a curing catalyst, octylic acid salt of 1,8-diaza-bicyclo(5,4,0)undecene-7, produced by San-Apro;
[6] trade name of potassium salt containing curing catalyst, produced by Air products;
[7] trade name of a curing catalyst, 2-methyltriethylenediamine, produced by Sankyo Air products.

TABLE 3

| | Formulations (part by weight) | |
|---|---|---|
| A Compound | Millionate MR200 | 54 |
| B Compound | SANNIX HD402[1] | 41.4 |
| | Dipropyleneglycol | 4.6 |
| | U-CAT SA 102 | 1.0 |
| | Dibutyltin dilaurate | 0.02 |

(1) NCO/OH equivalent ratio = 1.10
Note to Table 3:
[1] trade name of polyether polyol, having a hydroxyl value of 396, produced by Sanyo Kasei Kogyo.

COMPARATIVE EXAMPLE 1

In the recipe in Example 1, only U-CAT SA102 was not added, whereas methyl DABCO for making the same curability was increased to 0.4 parts, and molding was conducted according otherwise the same formulation, molding method and molding conditions as in Example 1.

As the result, reactant liquid leaked, excessively from around the mold gate and could not be filled completely into the mold.

EXAMPLE 5

According to the recipes shown in Table 3, molding was performed by varying the glass fiber contents.

The molding method and the molding conditions were the same as in Examples 1 to 4 to obtain molded products. The result is shown in Table 4.

TABLE 4

| M8609 Wt % | 17 | 31 | 35 | 45 |
|---|---|---|---|---|
| specific gravity | 1.27 | 1.36 | 1.40 | 1.43 |
| Flexural modulus Kgf/cm$^2$ | 46,000 | 67,000 | 72,000 | 79,000 |
| Flexural strength Kgf/cm$^2$ | 1,310 | 1,870 | 2,110 | 2,100 |
| Tensile strength Kgf/cm$^2$ | 770 | 1,250 | 1,370 | 1,580 |
| Elongation % | 2 | 3 | 2 | 2 |
| Izot impact Kgf-cm/cm | 23 | 41 | 49 | 71 |

We claim:

1. A method for making a polyurethane type composite, which method comprises:

a) reaction injection molding a formulated liquid in a mold wherein fibrous reinforcing material is previously set; then b) delaying curing of the formulated liquid by means of a delayed action catalyst;

wherein the formulated liquid comprises an organic polyisocyanate, a polyol which has a hydroxyl value of between about 300 and 800, and the delayed action catalyst, which delayed action catalyst is an octylic acid salt of 1,8-diazabicyclo(5,4,0)undecene-7.

2. The method of claim 1 wherein the equivalent ratio of the organic polyisocyanate to the polyol is between about 0.9 and 2.0.

3. The method of claim 1 wherein the equivalent ratio of the organic polyisocyanate to the polyol is between 1.0 and 1.5.

4. The method of claim 1 wherein the fibrous reinforcing material is a continuous strand glass mat.

5. The method of claim 1 wherein the organic polyisocyanate is a polyphenylene polymethylene polyisocyanate.

* * * * *